(12) United States Patent
Gurreri

(10) Patent No.: US 7,207,724 B2
(45) Date of Patent: Apr. 24, 2007

(54) CONNECTOR AND RECEPTACLE CONTAINING A PHYSICAL SECURITY FEATURE

(75) Inventor: Michael Gurreri, York, PA (US)

(73) Assignee: Tyco Electronics Corporation, Middletown, PA (US)

( * ) Notice: Subject to any disclaimer, the term of this patent is extended or adjusted under 35 U.S.C. 154(b) by 16 days.

(21) Appl. No.: 10/982,374

(22) Filed: Nov. 5, 2004

(65) Prior Publication Data
US 2005/0176308 A1 Aug. 11, 2005

(51) Int. Cl.
*G02B 6/38* (2006.01)
(52) U.S. Cl. .......................... 385/58; 439/488
(58) Field of Classification Search ............... 385/56, 385/58, 76, 77, 78, 85; 439/488, 677, 680
See application file for complete search history.

(56) References Cited

U.S. PATENT DOCUMENTS

| 4,596,436 A | * | 6/1986 | Kraemer et al. | 439/701 |
| 4,746,298 A | * | 5/1988 | Hollander | 439/222 |
| 4,764,129 A | * | 8/1988 | Jones et al. | 439/677 |
| 4,784,614 A | * | 11/1988 | Sadigh-Behzadi | 439/488 |
| 5,342,221 A | * | 8/1994 | Peterson | 439/677 |
| 5,729,644 A | * | 3/1998 | Shiflett et al. | 385/59 |
| 5,902,155 A | * | 5/1999 | Polgar et al. | 439/680 |
| 6,357,930 B1 | * | 3/2002 | Wiltjer | 385/60 |
| 6,383,032 B1 | * | 5/2002 | Gerberding | 439/681 |
| 6,419,400 B1 | * | 7/2002 | Wiltjer et al. | 385/55 |

\* cited by examiner

*Primary Examiner*—Thanh-Tam Le

(57) ABSTRACT

A network comprising: (a) a plurality of different receptacles for facilitating a connection to different information networks requiring different access authorization, each different receptacle optically or electrically coupled to one and only one different information network, each different receptacle having an inner surface with a unique first geometry; and (b) a plurality of different plugs for optically or electrically coupling with the different receptacles, each different plug having a unique second geometry, each unique first geometry corresponds to one, and only one, unique second geometry of a plug such that plugs and receptacles having corresponding unique first and second geometries are mating pairs.

16 Claims, 5 Drawing Sheets

CONNECTOR AND RECEPTACLE CONTAINING A PHYSICAL SECURITY FEATURE

CROSS REFERENCE TO RELATED APPLICATIONS

This application claims priority to U.S. Provisional Application No. 60/218,705, filed Jul. 17, 2000 and to copending U.S. application Ser. No. 09/908,140 filed Jul. 17, 2001, both of which are hereby incorporated by reference.

FIELD OF THE INVENTION

The present invention relates generally to connectors for use in telecommunication networks, and, more specifically, to a connector system in which only certain plugs can mate with certain receptacles to provide discriminating access to particular networks.

BACKGROUND OF THE INVENTION

Fiber optic communication systems have become increasing more popular in recent years as fiber optic technology offers several advantages over the conventional copper wire-based technology. For example, fiber optic communication systems provide substantially increased bandwidth, allowing large volumes of data to be transferred quickly over long distances. Additionally, optical communication systems neither generate nor are susceptible to electromagnetic interference (EMI). Fiber optic systems not only are gaining acceptance as the backbone of many network systems, but are also displacing copper wire technology as the preferred medium for connecting various workstations to the network system. These applications are often referred to as fiber-to-the-desk (FTTD) applications.

The growth of FTTD applications has increased the demands on optical connectors which serve to connect fibers to one another. In particular, connectors are needed that are small enough to be used in an office environment and field installable. A group of connectors were developed to meet this need and are known as Small Form Factor (SFF) connectors. SFF connectors are designed to be the fiber optic equivalent of the small connectors used in copper wire technology, such as, for example, RJ-45 connectors. These small, efficient, easy-to-use SFF connectors have become a new industry standard and are expected to contribute to the continued growth of FTTD applications. One SFF connector of particular interest herein is the MT-RJ connector. Details on the construction of this type of connector can be found in U.S. Pat. No. 6,224,268, issued to Manning.

Recently, a need has developed to limit user access to particular fiber optic data networks for security or other purposes. While some restrictions may be achieved using software (e.g., passwords), further restriction using some type of physical barrier to the networks is desired. Therefore, there is a need to prevent unauthorized users from connecting to data networks using physical barriers. The present invention fulfills this need among others.

SUMMARY OF THE INVENTION

The present invention provides for a connector system in a network that provides discriminating mating between plugs and receptacles by using a system of geometrically matched connector components which allow certain pairs of connectors to mate but which prevent all other combinations of connectors to mate.

Accordingly, one aspect of the invention is a network using the connector system that provides discriminating mating between plugs and receptacles. In a preferred embodiment, the network comprises: (a) a plurality of different receptacles for facilitating a connection to different information networks requiring different access authorization, each different receptacle optically or electrically coupled to one and only one different information network, each different receptacle having an inner surface with a unique first geometry; and (b) a plurality of different plugs for optically or electrically coupling with the different receptacles, each different plug having a unique second geometry, each unique first geometry corresponds to one, and only one, unique second geometry of a plug such that plugs and receptacles having corresponding unique first and second geometries are mating pairs.

Another aspect of the invention is a method of limiting access to information networks. In a preferred embodiment, the method comprises: (a) providing a network comprising a plurality of different receptacles for facilitating a connection to different information networks requiring different access authorization, each different receptacle being optically or electrically coupled to one and only one different information network, each different receptacle having an inner surface with a unique first geometry; and (b) providing a first user authorized to access a first information network of the different information networks with a first plug of a plurality of different plugs for coupling with the different receptacles, each different plug having a unique second geometry, each unique first geometry corresponds to one, and only one, unique second geometry of a plug such that plugs and receptacles having corresponding unique first and second geometries are mating pairs, the first plug forming a mating pair with a different fiber receptacle optically or electrically coupled to the first information networks; and (c) providing a second user authorized to access a second information network of the different information networks with a second plug of the plurality of different plugs, the first and second information networks being different, the second plug forming a mating pair with a different fiber receptacle optically or electrically coupled to the first information networks.

DETAILED DESCRIPTION OF THE INVENTION

Figure 1:
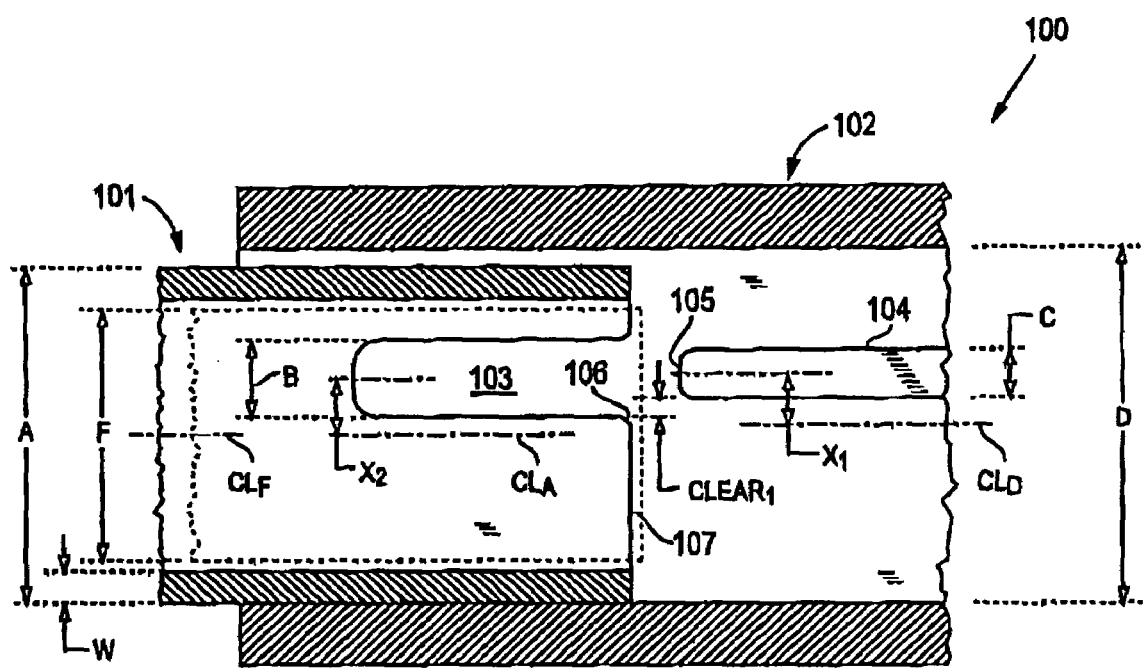
FIG. 1 depicts a top view of a plug as it is insert into the inside portion of the jack, which is known as the tub portion of the jack, for connector intended to mate.

The present invention relates to a connector system comprising a series of connector components which interconnect with each other in a discretionary way. Referring to FIG. 1, a preferred embodiment of a mating plug 101 and receptacle 100 of the connector system is illustrated. As shown, the plug 101 is partially inserted into the receptacle 100, which, in this embodiment, is a jack having a tub portion 102. Although a jack is discussed herein in detail, it should be understood that the receptacle of the present invention is not restricted to a jack and may be any structure configured to receive a plug, including, for example, an adapter for connecting two plugs together or an integral connector on an active device (e.g., transceiver) or passive device (e.g., splitter).

The plug typically contains a conductive element such a fiber or wire which mates with a similar element in the receptacle. In fiber optic applications, it is common for the conductive element to be contained in a ferrule, which in turn is housed by the plug. In a preferred embodiment, the ferrule is an MT-type ferrule.

The outer surface of the plug 101 and the inner surface of the tub 102 have first and second geometries, respectively, which cooperate to allow only certain pairs of plugs and receptacles to mate (herein "mating pairs," "mating plug and jack," or "keyed pair"), and which physically interfere for all other combinations of plugs and jacks (herein "non-mating pairs," "non-mating plugs and jacks" or non-keyed pairs), thereby preventing non-mating plugs and jacks from effecting an optical or electrical coupling.

The first and second geometries may embody any known keying mechanism which discriminates between connector components. Such keying mechanisms include, for example, a key and slot relationship between the plug and jack, a receptacle dimensioned to receive only certain sized or shaped plugs, and even a magnetic signature for either attracting (for mating pairs) and repulsing (Non-mating pairs). Preferably, the keying mechanism involves just a slight modification to the plug and jack such that essentially the same molds can be used to manufacture connectors of different keyed pairs. Although molding is preferred, it is should be understood that other techniques for producing the first and second geometries can be used including, for example, over molding and machining.

In a preferred embodiment, the invention uses a key and slot mechanism. Specifically, the slot can be embodied in the first or second geometry and the key can be embodied in the other geometry. In the particularly preferred embodiment shown in FIGS. 1–4, the key is part of the second geometry, while the slot is part of the first geometry; that is, the plug 101 has a slot 103 and the tub portion 102 of the jack has a key 104.

Figure 4:
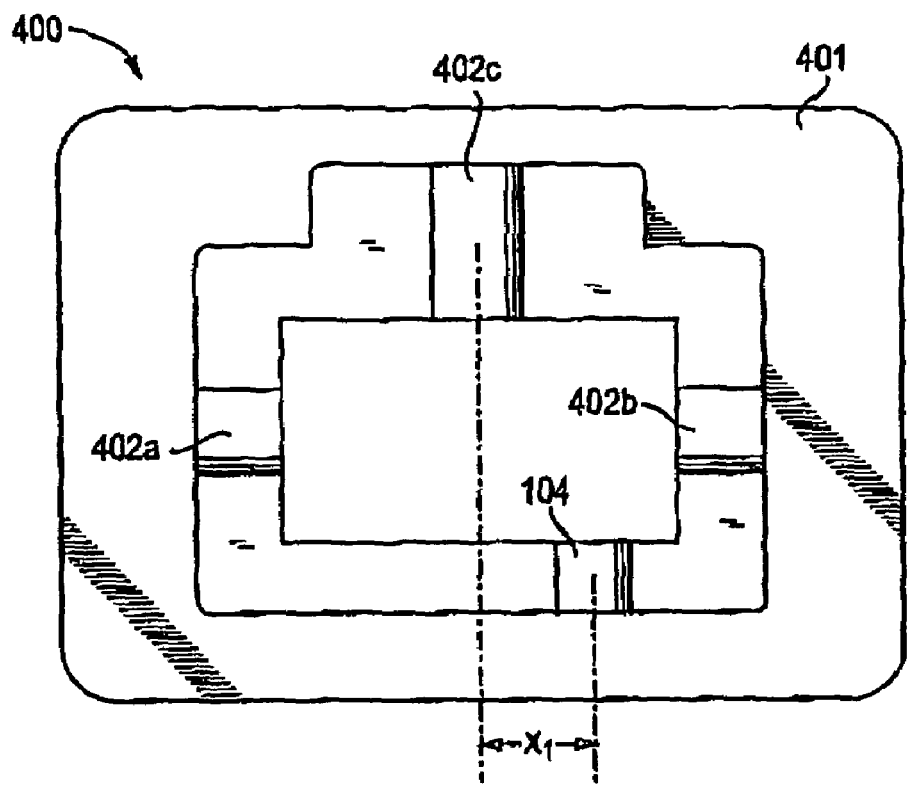
FIG. 4 depicts an end view of the tub component, showing the key which is used to allow or prevent mating with a particular plug.

This configuration is preferred since the key may cooperate with other "ribs" on the connector for pre-alignment purposes. More specifically, with particular reference to FIG. 3, an end view of housing 301 of the plug 101 is shown. The housing comprises four walls each wall having a slot 103, 302a, 302b, and 302c, respectively. FIG. 4 depicts an end view of housing 401 of the tub 400 in which the key 104 and ribs 402a, 402b, and 402c are disposed on the walls of the housing. The key 104 and the ribs 402a, 402b, and 402c cooperate with the slots 103, 302, 302a, 302b, and 302c, respectively, to effect pre-alignment of ferrule located within the plug with the jack before final mating of the connector plug with the connector jack. The final mating may be between the conductive elements of the connector system, such as, for example, between a couple of MT-type ferrules, which employ precise alignment pins/receiving holes on the ferrule face. Such ferrules are well known in the art. By pre-aligning the MT ferrules through the synergistic use of the key and slot, the inter-engagement of the closely-toleranced alignment pins/receiving holes is facilitated. The above-described synergistic keying and aligning feature of the present invention is realized with the MT-RJ connector (Tyco Electronics, Harrisburg, Pa.).

Figure 2:
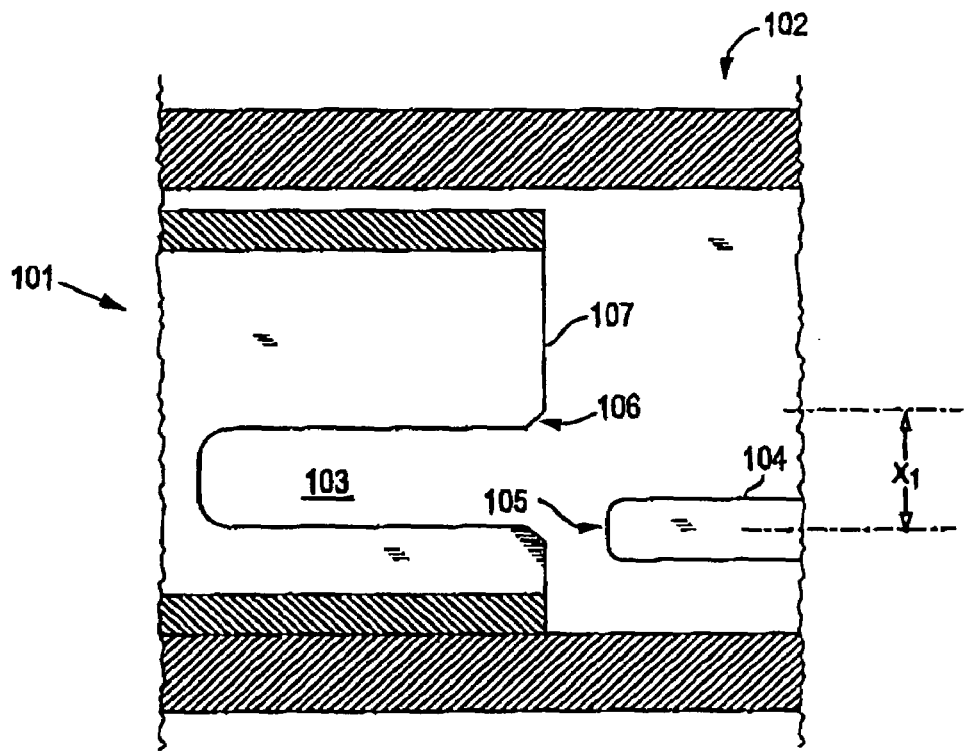
FIG. 2 depicts an expanded top view of the end of the key shown prior to an attempt to mate the connector plug with the tub of a connector jack for a connector not intended to mate.
Figure 3:
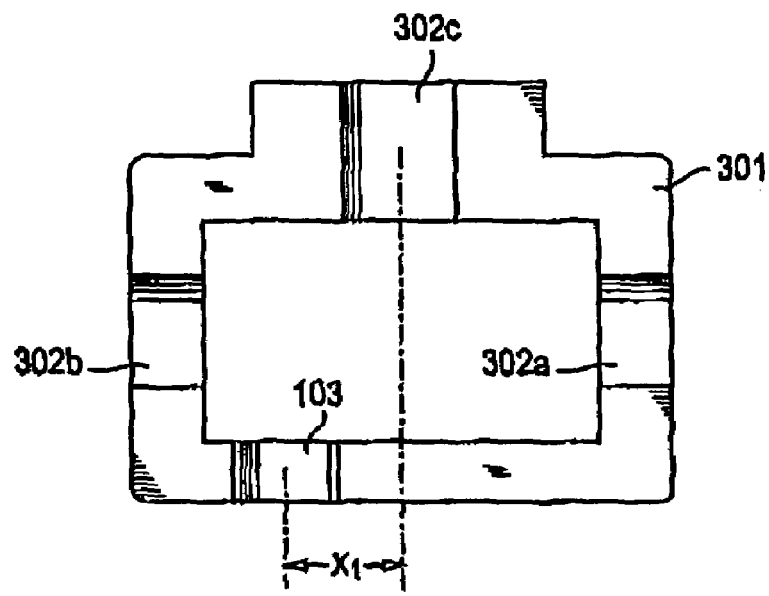
FIG. 3 depicts an end view of the plug component, showing a slot which is used to allow or prevent mating with a particular tub.

In a preferred embodiment, the mating end of the key 104 contains a flat portion shown as 105 and the mating end of the plug 101 has a chamfers 106 on the corners of the edges of the slot 103, while the remainder of the mating end of the plug comprises a flat portion 107. The radius corners on the key 106 and the chamfers on the plug 107 work as a guiding device and provide for the necessary alignment between the key and the slot when the plug is inserted into the tub of the jack. On the other hand, as shown in FIG. 2, when a user attempts to mate two non-mating plug and jack components, the flat portion of the key 105 contacts the flat portion of the plug 107 and provides for definite physical interference between the plug and jack when slot and key do not correspond. Accordingly, the use of this geometry prevents a user from forcing two non-mating plugs and jacks together. Therefore, the physical interference provided between the flat portion 105 of the tub and the flat portion 107 of the key assures that only desired combinations of plugs and jacks will mate.

Figure 5:
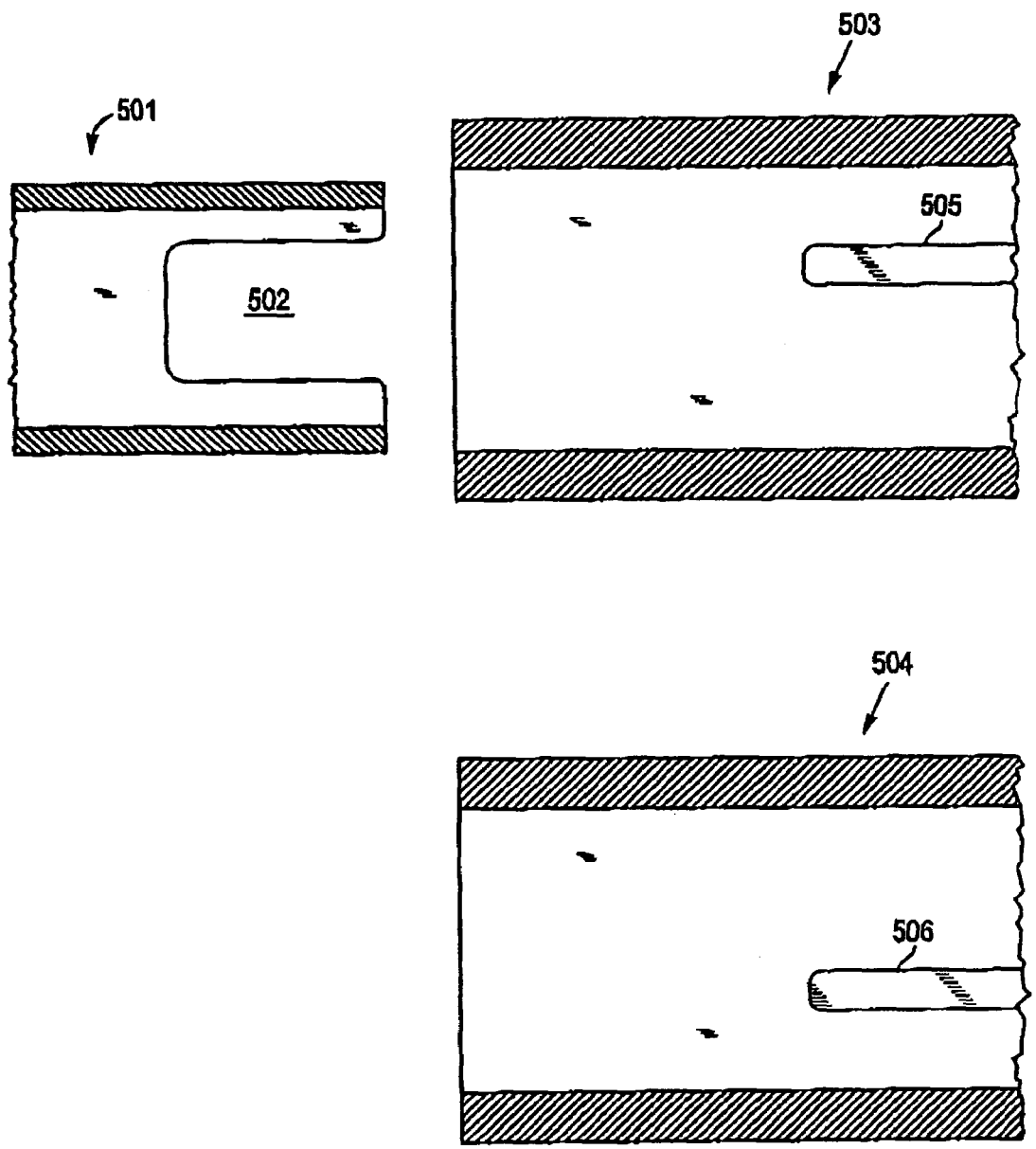
FIG. 5 depicts a plug with a slot configuration capable of mating with a plurality of jacks (i.e., a master plug).

The position of the key 104 on the tub 102 and the slot 103 on the plug 101 can be varied in such a manner so that a plurality of mutually-exclusive slot and key positions are formed. In one embodiment, the series of key and slot locations are mutually exclusive so that there is a one-to-one correspondence between jacks and plugs. In another embodiment, certain plugs may be configured to mate with a variety of different jacks. For example, it may be worthwhile to give network administers or people with high security clearance certain "master" plugs which are capable of mating with a number of jacks having different slot positions. Referring to the figures, FIG. 5 shows an embodiment of a master plug 501 which has a slot 502 that is configured (which, in this embodiment, means it is wide enough) to mate with jacks 503 and 504 which have different key positions 505 and 506, respectively. Although a wide slot is used in this embodiment to effect mating with two or more jacks having different key configurations, it should be understood that other embodiments are possible, such as, for example a plug with two or more slots.

The number of possible mutually exclusive mating pairs for a given plug and receptacle is a function of the physical parameters of the plug and the receptacle. More specifically, with reference to FIGS. 1–4, mutual exclusivity is ensured by adhering to the following relationships:

$$X_1 - C/2 + (D-A) + \Delta <= F/2 \tag{1}$$

$$X_2 + B/2 < A/2 - W \tag{2}$$

$$X_{1a} + \text{Clear}_1 + Z = X_{1b} \tag{3}$$

wherein:
A=the width of the plug 101;
B=the width of the slot 103 on the plug 101;
C=the width of the key 104;
D=the distance across the opening of the tub;
F=the width of the ferrule residing within the plug;
$\Delta = CL_F - CL_A$, wherein
$CL_A$=centerline of the width of the plug; and
$CL_F$=centerline of the ferrule residing within the plug.
$X_1$=the distance from the center of the opening in the tub 102 to the center of the key 104 for each mutually exclusive position.

$X_2$=the distance from the center of the plug 101 to the center of the slot 103 for each mutually exclusive position;

$X_{1a}$=the $X_1$ distance for a sequentially first key in a series of connectors;

$X_{1b}$=the $X_1$ distance for a sequentially second key in a series of connectors;

W=the wall thickness of the plug housing

Z=the minimum distance required to ensure that the flat portion of the key does not contact the flat portion of the plug 107 when a user attempts to mate a mating pair;

$Clear_1$=the clearance distance between the center side of the key and the center side of the slot;

These relationships must be satisfied for the mating pairs to mate and for the non-mating pairs to definitely not mate. Specifically, for a mating pair, Relationship (1) requires that half the ferrule width must be no less than $X_1$ less one half of C added to the difference between the width of the tub opening D less the width of the plug added to the difference between the centerline of the ferrule within the plug and the centerline of the plug. This ensures that the key is not positioned outside of the area on which at least a portion of the ferrule will reside. By adhering to this parameter, the key will have some overlap with the ferrule, and thus will provide for pre-alignment of the ferrule in the same manner as do the ribs on the three sides of the ferrule without the key.

Relationship (2) requires that $X_2$ added to one-half of dimension B is less than one-half of dimension A less W. This assures that the slot resides on the plug within the confines of the plug walls.

Finally, according to Relationship (3), for each mutually exclusive position, the distance $X_1$ for the first connector in the system ($X_{1a}$) added to $Clear_1$ added to a predefined interference interval Z would correspond to the distance $X_1$ for the next slot/key position ($X_{1b}$). Z is the minimum distance required to ensure that the flat portion of the key does not contact the flat portion of the plug 107 when a user attempts to mate the two portions of a connecter which is intended to mate.

By way of example, four mutually exclusive locations for locating the slot on the plug housing and the key on the tub are defined below for an MT-RJ connector. The MT-RJ connector has the following dimensions:

A=7.15±0.05 mm
B=1.25 mm
C=0.95±0.04 mm
D=7.24±0.04 mm
F=4.5±0.04 mm
$Clear_1$=0.15 mm
W=0.8 mm Based on these MT-RJ dimensions, it has been found that the following $X_1$ key positions satisfy the relationships above:

| Mating pair | Key Position | $X_1$ |
|---|---|---|
| 1 | 1 | 0.8 mm |
| 2 | 2 | 1.6 mm |
| 3 | 3 | −0.8 mm |
| 4 | 4 | −1.6 mm |

Although the data above indicates four mutually exclusive positions, it should be understood that additional positions are possible within the parameters of the MT-RJ connector. Additionally, it should be understood that the combinations of various key positions can be used to increase the number of permutations of mating pairs. For example, in addition to the four mating pairs listed above, additional mating pair configurations may obtained from the following combinations of key positions:

| Mating pair | Key Positions |
|---|---|
| 5 | 1, 2 |
| 6 | 1, 2, 3 |
| 7 | 1, 2, 3, 4 |
| 8 | 2, 3 |
| 9 | 2, 4 |
| 10 | 2, 3, 4 |
| 11 | 3, 4 |
| 12 | 1, 3 |
| 13 | 1, 4 |
| 14 | 1, 3, 4 |
| 15 | 1, 2, 4 |

In a preferred embodiment, the key and slot components are combined with the industry standard MT-RJ connector. FIG. 6 and FIG. 7 show the key-slot combination added to the MT-RJ connector as produced by Tyco Electronics of Harrisburg, Pa.

Figure 6A:
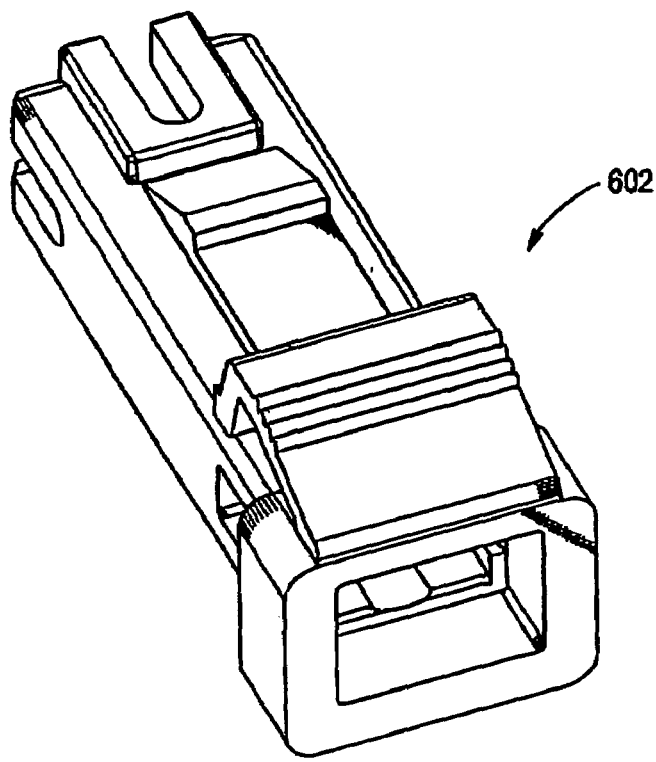
FIG. 6 and FIG. 7 shows the slot and key features as combined with an MT-RJ connector manufactured by Tyco Electronics (Harrisburg, Pa.).
Figure 6B:
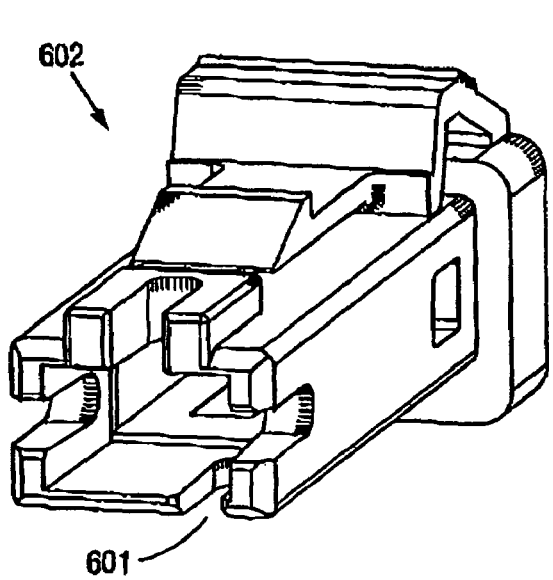
Figure 6C:
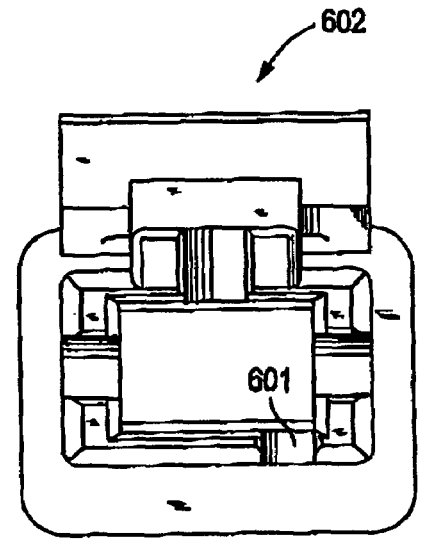
Figure 7A:
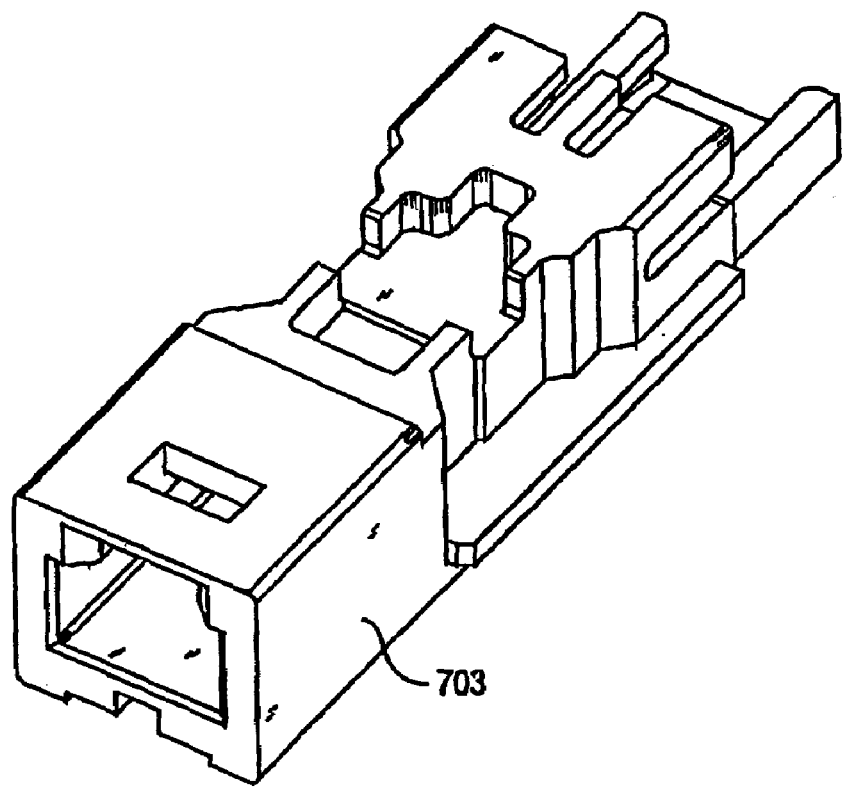
Figure 7B:
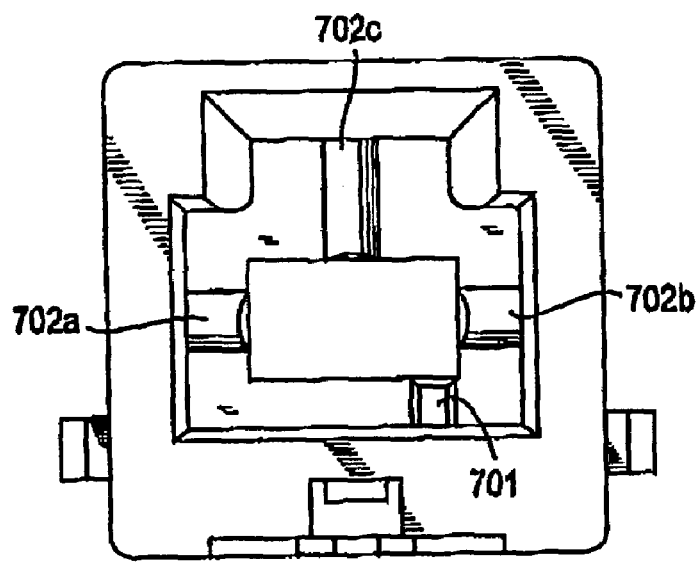

FIGS. 6(a)–(c) show the plug 602 of the MT-RJ connector combined with the slot 601 of the present invention. FIGS. 7(a) and 7(b) show the center tub portion 703 of an MT-RJ connector jack. The key is shown as 701 located in one of the plurality of possible positions. The three pre-alignment ribs are shown as 702a, 702b, and 702c. The key 701 functions as the discriminating member for allowing or preventing mating with a plurality of plugs, while at the same time functioning as the pre-alignment member for the remaining side of the ferrule not aligned with ribs 702a, 702b, and 702c.

To provide a simple and readily apparent indication to the user of which plugs mate with which receptacles, it is preferable to mark mating pairs with indicia or color to indicate their compatibility. In a preferred embodiment, the components of a mating pair are a similar color different from all others used in the connector system.

The system described allows for a series of mutually-exclusive connectors to be used in a manner which provides physical security to a network system. In light of the often highly sensitive data stored on many of the networks in use today, this is a highly desirable feature. The present invention is an effective way to segregate separate networks and assure that the proper users are connecting to the desired network. Additionally, the present invention may be employed in the manufacture of devices in which fibers or wires need to be connected in particular arrangements. More specifically, the discriminating connectors of the present invention can be engineered into a system such that, during manufacturing, the correct connection of the fibers/wires is ensured by the mating pairs and their ability to prevent all other "incorrect" connections. Applications requiring particular routing of fibers or wires include, for example, routers, backplane assemblies, and even component devices such as multiplexers/demultiplexers.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A network comprising:
   a plurality of different receptacles for facilitating a connection to different information networks requiring different access authorization, each different receptacle optically or electrically coupled to one and only one different information network, said each different receptacle having an inner surface with a unique first geometry; and
   a plurality of different plugs for optically or electrically coupling with said different receptacles, each different plug having a unique second geometry, said each unique first geometry corresponds to one, and only one, unique second geometry of a plug such that said plugs and receptacles having corresponding unique first and second geometries are mating pairs;
   wherein each mating pair is marked with a matching visual identification different from said plugs and receptacles having different first and second geometries, said visual identification being at least one of color, alphanumerical, or symbol; and
   wherein the network further comprising said different information networks, each different information network is on a different optical or electrical circuit and each different receptacle is optically or electrically connected to one and only one different circuit.

2. The network of claim 1, wherein the number of mating pairs is four.

3. The network of claim 1, wherein said first and second geometries include a keying mechanism to render said different receptacles and plugs unique.

4. The network of claim 3, wherein said keying mechanism is at least one of a key and slot relationship between the plug and receptacle, said receptacle dimensioned to receive only certain sized or shaped plugs, or a magnetic signature for attracting mating pairs and repelling non-mating pairs.

5. The network of claim 4, wherein said keying mechanism is a key and slot mechanism.

6. The network of claim 5, wherein said first geometry includes said key, and said second geometry includes said slot.

7. The network of claim 6, wherein said each receptacle comprises a receptacle having a tub, said tub comprising said key and a plurality of ribs extending inward, said each plug comprising a housing and a ferrule contained within the housing, said housing comprising said slot for cooperating with said key and secondary slots for cooperating with said ribs, said slot and said secondary slots receiving said key and said ribs to effect pre-alignment of said ferrule before final mating of said ferrule.

8. The network of claim 5, wherein said first geometry includes said slot, and said second geometry includes said key.

9. The network of claim 1, wherein said plugs and receptacles are optical and said network is optical.

10. A network comprising:
    a plurality of different circuits, each circuit having access to information requiring different access authorization;
    a plurality of receptacles, each receptacle having an inner surface with a first geometry, said first geometry comprising at least a slot, a certain number of receptacles having different first geometries in which the slots are in different positions said each receptacle having said different first geometry corresponds to one and only one different circuit; and
    a plurality of plugs, said each plug having said second geometry, said second geometry comprising at least a key in a certain position, said certain number of plugs having different second geometries in which the keys are in different positions, each plug having a different second geometry corresponds to one and only one different circuit, each different said first geometry corresponding to one and only one second geometry such that the plugs and receptacles of corresponding first and second geometries are mating pairs;
    wherein the mating pair is marked with a matching visual identification different from said plug and receptacle having different first and second geometries, said visual identification being at least one of color, alphanumerical, or symbol.

11. The network of claim 10, wherein the connector type is push-pull connectors.

12. The network of claim 10, wherein the connector type is an MT type connector.

13. The network of claim 10, further comprising a universal plug having no key to interfere with said first and second receptacles.

14. The network of claim 10, wherein said plugs and receptacles are optical and said network is optical.

15. A method of limiting access to information networks within a network, said method comprising:
    providing a network comprising a plurality of different receptacles for facilitating a connection to different information networks requiring different access authorization, each different receptacle optically or electrically coupled to one and only one different information network, said each different receptacle having an inner surface with a unique first geometry; and
    providing a first user authorized to access a first information network of said different information networks with a first plug of a plurality of different plugs for coupling with said different receptacles, each different plug having a unique second geometry, each unique first geometry corresponds to one, and only one, unique second geometry of a plug such that plugs and receptacles having corresponding unique first and second geometries are mating pairs, said first plug forming a mating pair with a different fiber receptacle optically or electrically coupled to said first information networks; and
    providing a second user authorized to access a second information network of said different information networks with a second plug of said plurality of different plugs, said first and second information networks being different, said second plug forming a mating pair with a different fiber receptacle optically or electrically coupled to said first information networks;
    wherein each mating pair is marked with matching visual identification which is unique among the different mating pairs, said visual identification being at least one of color, alphanumerical, or symbol.

16. The method of claim 15, wherein said plugs and receptacles are optical and said network is optical.

* * * * *